(12) United States Patent
Troxell et al.

(10) Patent No.: US 7,095,567 B2
(45) Date of Patent: Aug. 22, 2006

(54) REFRACTIVE BLOCK AND IMAGING SYSTEMS FOR USE IN AUTOMOBILES

(75) Inventors: John R. Troxell, Sterling Heights, MI (US); Ronald M. Taylor, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/919,163

(22) Filed: Aug. 16, 2004

(65) Prior Publication Data

US 2006/0034002 A1    Feb. 16, 2006

(51) Int. Cl.
*G02B 27/14* (2006.01)
*G02B 17/00* (2006.01)
*G02B 3/00* (2006.01)

(52) U.S. Cl. .................................. 359/737; 359/630

(58) Field of Classification Search ............... 359/629, 359/630, 636, 638, 639, 641, 720, 737; 348/115, 348/118, 119
See application file for complete search history.

(56) References Cited

U.S. PATENT DOCUMENTS 5,172,100 A * 12/1992 Iino ........................... 359/630
6,928,180 B1 * 8/2005 Stam et al. .................. 701/36

* cited by examiner

*Primary Examiner*—Alicia M Harrington
(74) *Attorney, Agent, or Firm*—Stefan V. Chmielewski

(57) ABSTRACT

A refractive block includes a light-entrance surface configured to be mounted in contact with a refractive boundary of a vehicle, and a light-exit surface wherein the refractive block is configured to refract an optical path of light corresponding to an imaged area and to direct the light to an image-sensing component.

27 Claims, 8 Drawing Sheets

REFRACTIVE BLOCK AND IMAGING SYSTEMS FOR USE IN AUTOMOBILES

BACKGROUND

Imaging systems are frequently used in automotive systems to provide imaging of the roadway around the vehicle. In the case of frontal images, the images provided by the imaging systems are often used by other systems, such as lane tracking systems, adaptive cruise control systems, or other systems. The function of these system depends, at least in part, on the quality of the images acquired by the imaging system.

In order to implement imaging systems for automotive applications that involve imaging outside the vehicle, several issues need to be addressed. One such issue relates to maintaining a clean optical path between the scene to be imaged and the imaging system itself. Many implementations make use of the existing optical cleaning systems afforded by vehicle windshield wipers that are used to help maintain a driver's vision clear. Such systems place the image-sensing component inside the vehicle, such that it "looks" out through the windshield in a region that is swept clean by the windshield wipers.

Typically, such an implementation would involve a location near the top of the windshield, in the center of the vehicle. The resulting geometry tends to reduce the amount of light that passes through the system to the imaging or detector, and the physical mounting of the imaging system becomes very cumbersome and bulky. Further, such a placement frequently results in the placement of the sensor system, in some cases, nearly parallel to the windshield. As shown in FIG. 1A, the portion of the inside of the windshield (10) through which the light impinging upon the sensor (12) passes, i.e. that portion of the windshield that must be kept clean in order for the sensor to function properly, combined with the area of the windshield obstructed by the camera itself becomes relatively large.

In attempts to minimize this accumulation of contaminants, some systems make use of an optically opaque boot or enclosure to completely enclose the optical path within the vehicle and isolate it from the rest of the vehicle passenger compartment. Such enclosures tend to further increase the apparent bulk of the imaging system implementation.

Other optical systems make use of mirrors. One such example includes external rearview mirrors. These mirrors are located in protrusions that extend outside of the vehicle. These protrusions limit the aerodynamic efficiency of the vehicle. Further, many attempts have been made to reduce or eliminate the protrusions for aesthetic reasons.

SUMMARY

A refractive block is provided for refracting the optical path of light corresponding to an imaged area and to direct the light to an image-sensing component. The refractive block includes a light-entrance surface for mounting to a refractive boundary of a vehicle and a light-exit surface. The refractive block minimizes the possibility that contaminants may accumulate in the optical path of light corresponding to the imaged area as the light travels from the imaged area to the image-sensing component. Further, the refractive block minimizes the footprint of the system and reducing the surface area on the outside surface of the refractive boundary that must be kept clean. Further, refractive blocks may reduce or eliminate the need for external protrusions for viewing an imaged area, such as side-view areas. Accordingly, refractive blocks may be used in several applications, including frontal imaging systems, side view imaging systems, and pedestrian/cross traffic identification systems.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A method and apparatus are provided herein to improve the implementation of vision systems that are designed to image scenes through optically refractive boundaries in vehicles. For example, one exemplary system is configured to be used in the sloped windshields of vehicles to provide images of what lies ahead of the vehicle. Another exemplary system is configured to be used with the side windows, to provide side views of the vehicle. Yet another exemplary system is configured to provide images to pedestrian/cross traffic identification systems.

These systems minimize the opportunity for contaminants (for example water vapor condensation, smoke, dust, vinyl precipitates, etc.) to interfere in the optical path between the inner surface of the windshield and the first surface of the image-sensing component. Further, these systems may be configured to minimize the opportunity for light reflected from surfaces within the vehicle, such as the vehicle dashboard and or objects setting upon the dashboard, to enter the optical path of the imaging system. Further, with respect to the mounting of an imaging system to the inner surface of a windshield, an exemplary apparatus is configured to minimize the intrusion of the imaging system into the passenger compartment while optimizing the optical path to the external-vehicle scenes being imaged.

In addition, exemplary side-view imaging systems provide for an imaging system that is substantially contained within the vehicle. Such a system reduces or eliminates the need for protrusions on the outside of the vehicle to provide side views of the vehicle. Other systems are configured to provide images to pedestrian/cross traffic identification systems while reducing or eliminating external protrusions. A general imaging system will first be discussed, followed by descriptions of exemplary frontal imaging systems, sideview imaging systems and systems for providing images to pedestrian/cross traffic identification systems.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

General Imaging System Having a Refractive Block

Figure 1A:
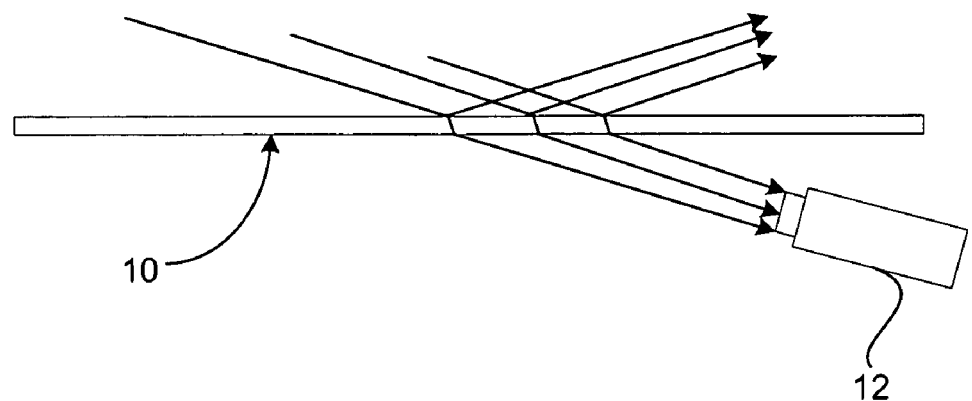
FIG. 1A illustrates a simple schematic view of a prior art imaging system.
Figure 1B:
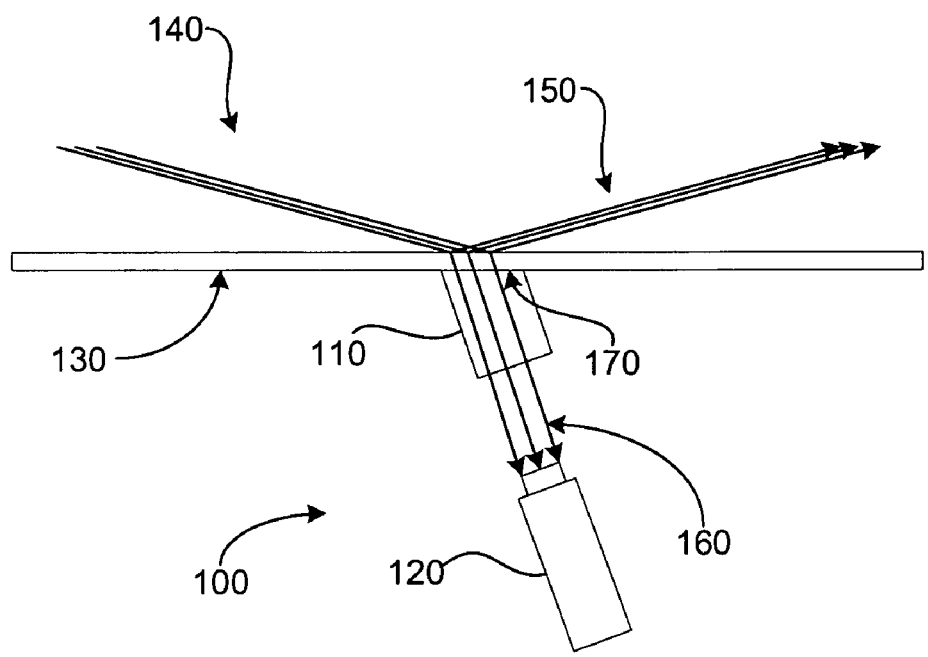
FIG. 1B illustrates a simple schematic view of an exemplary imaging system.

FIG. 1B is a general schematic view of an exemplary imaging system (100). The imaging system makes use of an optical block that "bends" light and conveys the light to an image-sensing component. As will be discussed in more detail below, this configuration minimizes the accumulation of contaminants in the optical path within a vehicle, minimizes the intrusion of the imaging system into the passenger compartment, and allows for the elimination of external protrusions in providing side/rear views of a vehicle and/or images for use in pedestrian/cross traffic identification systems.

As illustrated in FIG. 1B, the imaging system (100) includes a refractive block (110) of optically transparent material and an image-sensing component (120). The image-sensing component (120) receives light that is refracted through a refractive boundary (130), such as a windshield or window of a vehicle. In particular, when an incident light ray (140) reaches the refractive boundary (130), a reflected light ray (150) is reflected off the refractive boundary (130) and a refracted light ray (160) is directed through the refractive boundary (130). This light transmission will be discussed with reference to light that enters from an object outside of the vehicle and is transferred to the image-sensing component (120), which is on the inside of the vehicle.

The amount of incident light that is reflected off and through the refractive boundary (130) depends on several factors. These factors include the index of refraction of the medium through which the light is initially propagating, the index of refraction of the tranmissive boundary, contaminants in the optical path, and the angle of incidence of the incoming light. With respect to the angle of incidence, the greatest transmission of light occurs when the angle of incidence of light entering or exiting a surface is normal to that surface. In addition, when light passes through boundaries with different indices of refraction, light is frequently lost in the transmission.

The refractive block (110) is coupled to the refractive boundary (130) such that a light-entrance surface (170) is in contact with the refractive boundary (130). More specifically, an adhesive with an index of refraction substantially similar to the refractive boundary (130) is used to mount the refractive block (110) to the refractive boundary (130). As a result, the amount of light lost due to difference between the index of refraction of the refractive boundary (130) and the adhesive is minimized. Further, the index of refraction of the refractive block (110) may also be similar to the index of refraction of the refractive boundary and the adhesive. This configuration minimizes light loss as light passes through the refractive boundary (130) and into the refractive block (110).

As previously discussed, several factors may affect the performance of the imaging system (100) including the presence of contaminants or other particles in the optical path. These contaminants may accumulate on either the surfaces inside or outside of the vehicle on the refractive boundary (130). For example, dirt or other contaminants may accumulate on the outside surface of the refractive boundary (130). The refractive block (110) minimizes the surface area that must be kept clean. More specifically, the optical path of the imaging system (100) may be reduced to the surface area of the refractive block (110) that is in contact with the refractive boundary (130). This surface area (110) may be smaller than the surface area that must otherwise be kept clean, such as the surface area shown in FIG. 1A. Further, the optical path of light according to the present imaging system (100) may be placed closer to a viewer's field of view without placing the system (100) within the viewer's field of view. As a result, the overall footprint, or the entire space occupied by the system, may thereby be reduced.

In addition, the imaging system (100), which includes the refractive block (110), may minimize the amount of contaminants that can accumulate in the optical path within the refractive boundary (130). For example, the refractive block (110) may be secured to the refractive boundary (130) by techniques that minimize air flow between the refractive block (110) and the refractive boundary (130). Minimizing air flow between the refractive block (110) and the refractive boundary (130) minimizes the possibility that contaminants may accumulate in that space and thus accumulate in the optical path. As a result, the refractive block (110) may limit the accumulation of contaminants in the optical path, thereby improving the performance of the imaging system (100).

As previously introduced, one example of a refractive boundary (130) is a windshield. In such an implementation, the image-sensing component (120) may be configured to view an imaged area that is in front of the vehicle, or a front view, as will be discussed in more detail with reference to FIGS. 2–6. Another example of a refractive boundary is a side widow or substantially transparent side panel of an automobile. It should be noted that the side panel need only be transparent to the wavelengths of interest to the imaging system. For example, if the imaging system is only sensing wavelengths in the near infrared-light that is not detectable by a human observer, (e.g. 700 nm-1100 nm) then the side panel could be substantially opaque to a person viewing the panel, yet still be transmissive to the light that is being sensed through the panel. Similar behavior would be obtained for systems sensing longer wavelength infrared light, as well. In such an implementation, the image-sensing component (120) may be configured to capture images of the area on the sides of the automobile, and thus act as a side imaging system, as will be discussed in more detail with reference to FIGS. 7–9.

Frontal Imaging Systems

Figure 2:
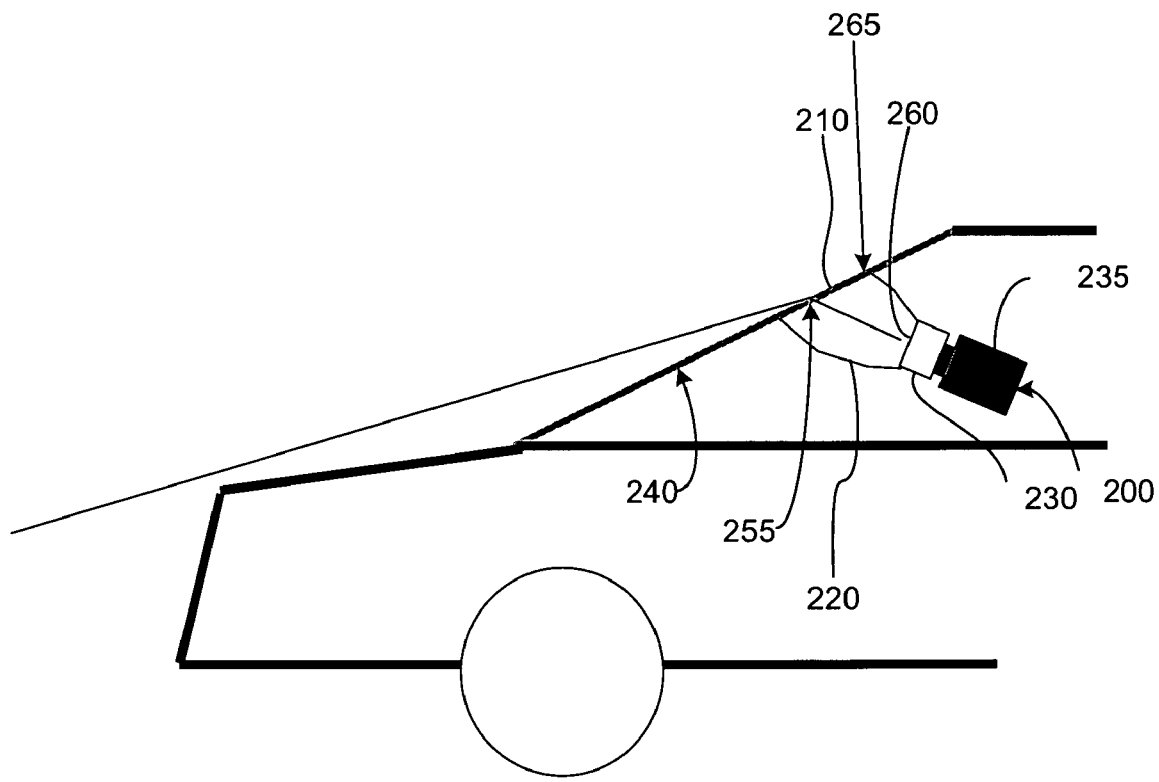
FIG. 2 illustrates a simple schematic view of an exemplary frontal imaging system.

FIG. 2 illustrates an exemplary frontal imaging system (200) that is mounted to a vehicle windshield (210). As will be discussed in more detail below, the imaging system (200) provides for increased system performance, which may include minimizing the amount of surface area on the outside of the windshield that must be kept clean, minimizing the buildup of contamination on the inside of the windshield, and maximizing light transmission through a refractive block (220).

The imaging system (200) includes a refractive block (220) coupled to the lens (230) of an image-sensing component (235). The refractive block (220) is located between an inner surface (240) of the vehicle windshield (210) and the lens (230). When light corresponding to an imaged area in front of the vehicle is refracted through the windshield (210), light enters the refractive block (220) through a light-entrance surface (255). The light passes through the refractive block (220) and exits through a light-exit surface (260).

After light exits the refractive block (220) through the light-exit surface (260), the light is directed to the lens (230). The lens (230) focuses the light onto the image-sensing component (235). The image-sensing component (235) then processes the light by converting it into a signal or signals. Several systems may make use of the processed information, such as lane-tracking systems, adaptive cruise control systems, and heads up displays for night imaging. The geometry of several exemplary blocks, including their corresponding light-entrance surfaces and light-exit surfaces, will now be discussed in more detail.

The refractive block (220) has an index of refraction that is substantially similar to the index of refraction of the windshield (210). Vehicle windshields (210) are frequently composed of glass and consequently have indices of refraction in the range of 1.45 to 1.55. Accordingly, the block (220) may also be formed of glass or polymeric materials having a comparable index of refraction in the range of 1.45 to 1.55. The refractive block (220) is coupled to the windshield (210) using a suitable filler material or adhesive material that is optically transparent and has a comparable index of refraction as that of the refractive block (220). As a result, light that is diffracted through the windshield (210) passes through a series of materials that each have substantially similar indices of refraction. As previously discussed, this correspondence between the indices of refraction minimizes the amount of light lost as the light is transmitted through the refractive block (220). Further, as previously introduced, this refractive block (220) minimizes the possibility that contaminants will accumulate in the optical path on the inside surface of the windshield (210).

As shown in FIG. 2 light travels through a block of material (220) that is in intimate contact with the windshield (210). Light from the imaged area reaches the windshield (210) at a relatively large angle of incidence, which is taken with respect to a line normal to the surface of the windshield (210). As a result, light corresponding to the frontal image is nearly parallel to the surface of the windshield. As previously discussed, conventional imaging systems are placed much higher in the vehicle, toward the top of the windshield (210).

In the present exemplary frontal imaging system (200), the refractive block (220) is located nearer a user's field of view without placing the refractive block (220) within the field of view. This configuration reduces the amount of surface area that is to be kept clean for proper operation of the imaging system. As a result, conventional methods of maintaining the user's field of view clean, such as windshield wipers, may also be able to keep the optical pathway on the outer surface (265) of the windshield (210) clean. Consequently, the imaging system (200) is more likely to operate properly.

Further, as previously discussed, the present imaging system (200) minimizes the possibility that contaminants will accumulate in the optical pathway on the inner surface of the windshield (210). The refractive block (220) is secured to the windshield (210) with adhesive. This configuration eliminates air flow over the optical pathway on the inner surface of the windshield, thereby minimizing the possibility that contaminants, such as condensation, smoke, or other contaminants will accumulate thereon. Consequently, more light is transmitted through the refractive block (220). As the light exits the refractive block (220), it does so through the light-exit surface (260).

The light-exit surface (260) of the refractive block (220) is substantially perpendicular to the optical path of the light as the light exits the refractive block (220). As a result, minimal light is reflected from the exit surface (260) back into the refractive block (220), such that substantially no refraction will occur for light exiting the light-exit surface (260). Limiting or eliminating internal refraction and refraction improves the quality of an image directed through the refractive block (220).

The quality of the image directed through the refractive block (220) may be further improved by controlling light at the peripheral surfaces, which include surfaces other than the light-entrance surface (255) and the light-exit surface (260). These surfaces may be treated or formed to intentionally minimize the transmission of light while simultaneously minimizing the reflection of light within the refractive block (220). For example, these surfaces may be intentionally roughened or otherwise textured in order to minimize light transmission and/or the reflection of light within the block from these surfaces refraction within the refractive block (220). Further, these surfaces may be coated with optically opaque materials to achieve the desired results. Ideally, light will be directed to exit from this block of optical material at substantially a perpendicular direction to the exit surface of the refractive block (220).

The image-sensing component (235), which may include an image sensor system or camera, is mounted substantially perpendicularly to the light-exit surface (255) of the refractive block (220). In the present exemplary light imaging system, the lens (230) is in close proximity with the light-exit surface (255). This relationship does not eliminate an air gap between the refractive block (220) and the lens (230), which includes the first optical surface of the optical sensor system or camera, in order to further minimize the accumulation of contaminants in the optical path. Consequently, the performance of a conventional lens in such a system would not be perturbed by the use of the refractive block.

Conventional lenses are frequently designed to operate with an air interface or other interfaces with similar indices of refraction. If a conventional lens is used in direct contact with the refractive block (220), the image sensed by the image-sensing component (235) may not correspond well with the imaged area. Accordingly, the lens (230) is adapted to focus the light such that light directed to the image-sensing component (235) is substantially similar to the output of a standard lens that receives an image through air or other similar interface.

The imaging system (200) may also be otherwise configured. For example, the light-exit surface (260) of the refractive block (220) may be formed as a non-planar surface, so as to become a first element of the optical elements of the optical sensor system or camera. In other words, the light-exit surface (260) may be formed to act as a lens to focus the image onto the image-sensing component (235). Other configurations may be implemented which make use of conventional lenses, as will now be discussed in more detail.

For example, the shape of the refractive block (220) may be tailored to optimize the packaging of the imaging system (200) in proximity to the windshield (210) and to suit the environment in which the imaging system (200) is to be used. Further, the image-sensing component (235) may be configured and positioned to receive images that have been refracted through the refractive block (220).

Figure 3:
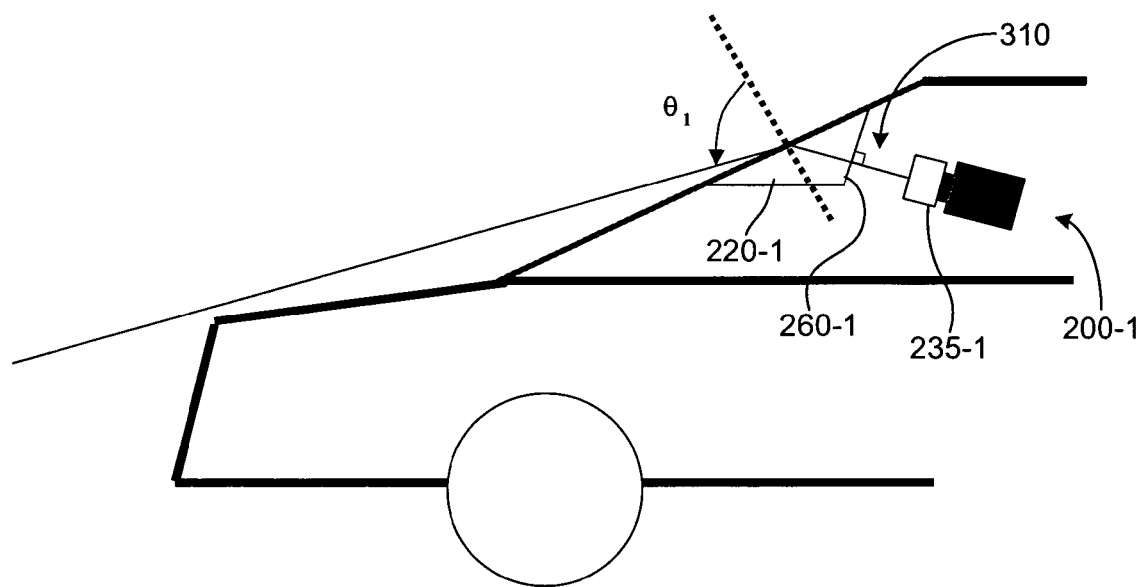
FIG. 3 illustrates a simple schematic view of an exemplary frontal imaging system.

FIG. 3 illustrates another exemplary frontal imaging system (200-1) that makes use of a conventional lens (235-1). Conventional lenses may be more readily available and/or less expensive, thereby possibly reducing the cost of such a system. An air gap (310) exists between the light-exit surface (260-1) and the lens (235-1). This air gap (310) allows the lens (235-1) to be of the conventional type; as such lenses are frequently designed to operate with an air interface. Further, as shown in FIG. 3, the refractive block (220-1) is configured such that the optical path is substantially perpendicular to the light-exit surface (260-1), which reduces the light loss due to internal reflections and refraction as previously discussed.

Figure 4:
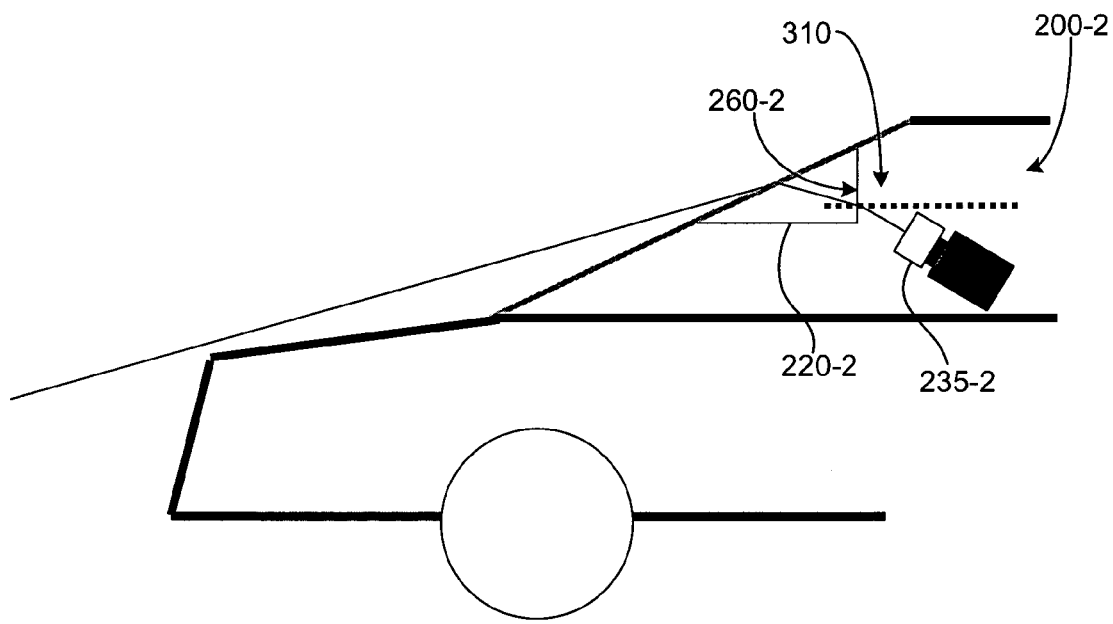
FIG. 4 illustrates a simple schematic view of an exemplary frontal imaging system.

FIG. 4 illustrates another exemplary frontal imaging system (200-2). If some small amount of light loss is acceptable, other exemplary frontal imaging systems may be implemented which make use of blocks of simple geometry. For example, as shown in FIG. 4 another exemplary frontal imaging system (200-2) include a simple right angle refractive block (220-2). Such a system may also be configured to make use of a conventional lens (235-2), which is similar to the conventional lens (235-1) described with reference to FIG. 3, because there is an air gap (310) between the light-exit surface (260-2) and the lens (235-2).

In such a system, the optical path of light exiting the light-exit surface (260-2) is not substantially perpendicular to the light-exit surface (260-2). As a result, as light exits the optical block, it is diffracted due to the difference in the index of refraction of the refractive block (220-2) and the air gap (310). Consequently, the line of sight for such a system lies below a line perpendicular to the light-exit surface. Accordingly, in such a system the image-sensing component may be placed in the line of sight and below a line normal to the light-exit surface.

As illustrated and discussed above, optical blocks with a variety of configurations may be used to reduce the size of a frontal-imaging system and/or to minimize the accumulation of contaminants in the optical path. Further, it may be advantageous to form antireflective coatings or films on the exit surfaces of any of the optical blocks (220, FIG. 2; 220-1, FIG. 3; 220-2, FIG. 4) to reduce the amount of internal reflection. One example may include a single film of magnesium fluoride ($MgF_2$). The thickness of such a film may be tuned to achieve the most desirable results to minimize surface reflections for the wavelength or wavelengths of interest. It will be clear that more complicated antireflective structures are also useable in the configurations described in the present application.

In addition, the optical blocks previously discussed have been solid blocks. The refractive block of material may be a solid block of material or may be comprised of an enclosure that contains a non-solid body of material having the requisite optical properties. In the later case, the enclosure must also have suitable optical properties. The use of materials with substantially different indices of refraction may also occur, following the consideration of the implications of the variation in index of refraction between the inside windshield surface and the refractive block entrance surface. Such effects may include the loss of light at this interface due to the mismatch. If this loss of light is tolerable, than such a mismatched interface may intentionally be chosen in order to optimize other aspects of the design, such as an increase in the magnitude of the angle by which the light is redirected in the refractive block of material.

An alternative implementation would incorporate an exit surface from the refractive block that is not normal to the optical path of light exiting from that surface. In this case, refraction will occur as light exits the optical block of material, altering the configuration of the imaging system. This may be advantageous in order to minimize the physical extension of the imaging system into the vehicle passenger compartment.

An alternative implementation would incorporate the exit surface of the optical block of material as the first surface (non-planar) of the imaging system. This would serve to minimize the opportunity for contaminants to interfere in the optical path between the windshield and the first surface of the imaging system, by minimizing the air gap between the refractive block exit surface and the first optical surface of the imaging system.

Side View/Rear View Imaging

Figure 5:
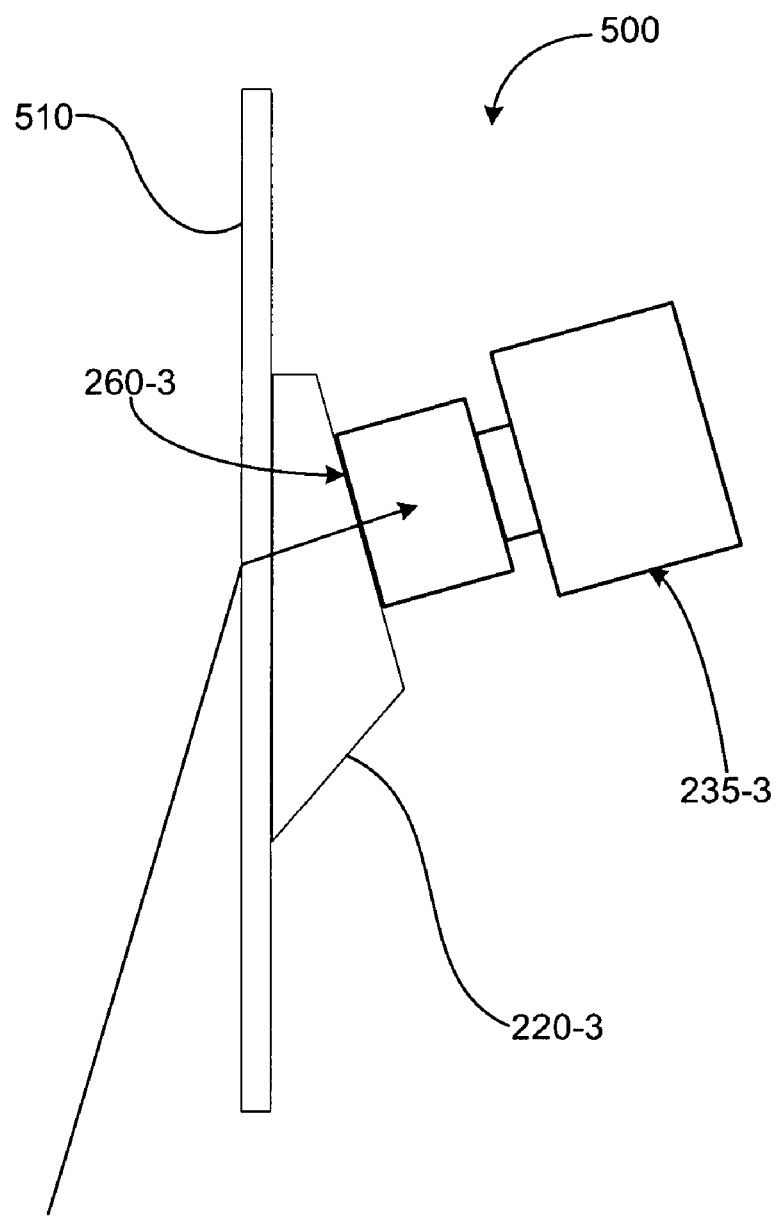
FIG. 5 illustrates a simple schematic view of an exemplary side view imaging system.

FIG. 5 is a schematic illustration of an exemplary side view/rear view/blind spot imaging system (500). The side-view imaging system (500) provides an image of what is alongside and to the rear of the vehicle by using components that are substantially contained within the vehicle. In other words, the side view imaging system (500) "bends" light corresponding to images to the side of the vehicle to a sensor contained within the vehicle to provide side views without external protrusions, such as those that conventionally are employed to contain external rear view mirror systems. The side-view imaging system generally includes a refractive block (220-3) of optically transparent material and an image-sensing component (235-3). The refractive block (220-3) receives light corresponding to an image on the side of a vehicle, such as that typically viewed through conventional side-view mirrors. When this light reaches the side window (510), some of the light is refracted through the side window (510) and into the refractive block (220-3). The light then passes through the refractive block (220-3) to the exit surface (260-3). The light exits the refractive block (220-3) at a right angle to the light-exit surface (260-3), and is detected by the image-sensing component (235-3) as previously discussed.

Figure 6:
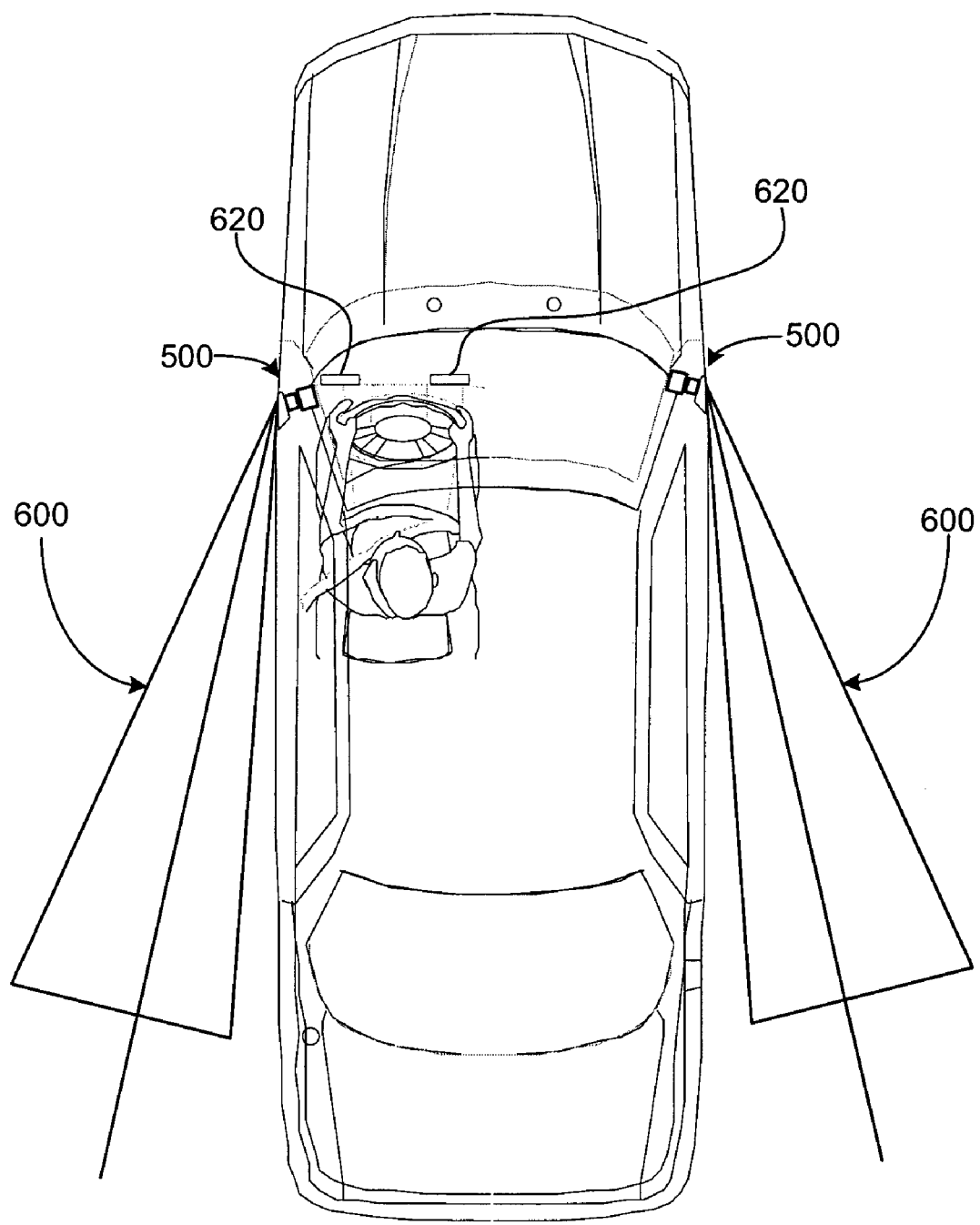
FIG. 6 illustrates a simple schematic view of an exemplary side view imaging system showing one possible imaged area.

FIG. 6 illustrates the field of view (FOV) (600) of the side-view imaging system (500) with respect to a vehicle. As shown in FIG. 6, the FOV (600) of the side-view imaging system (500) may provide at least as much side-view coverage as conventional side mirrors. The image within the field of view (600) is detected by the imaging component (235-3) which conveys the image to a driver by displays (620). The displays (620), which may be in front of the driver in a readily viewed position, allow the driver to concentrate more fully on the road while allowing the driver convenient and safe situational awareness of the region around his/her vehicle. Alternatively, a computer algorithm may be employed to analyze the information provided by the images and identify potential threats to the vehicle and its occupants, altering the driver by visual, aural, and or tactile means, possibly in addition to a direct display of the images being detected by the camera system. The driver's ability to view the side views of the vehicle are not substantially dependent on a line of sight from the driver, to the optical block (235-3), and to the object. As a result, the side view provided by the side-view imaging system (500) may be equally suitable for drivers with different physical characteristics. In some applications, this could eliminate the need for positioning or steering means for adjusting the line of sight as are currently provided for by conventional, external rear view mirror systems. The side view imaging system shown in FIG. 5–6 provide for a relatively fixed side view that may be optimized to image a desired portion of the side of a vehicle.

Figure 7:
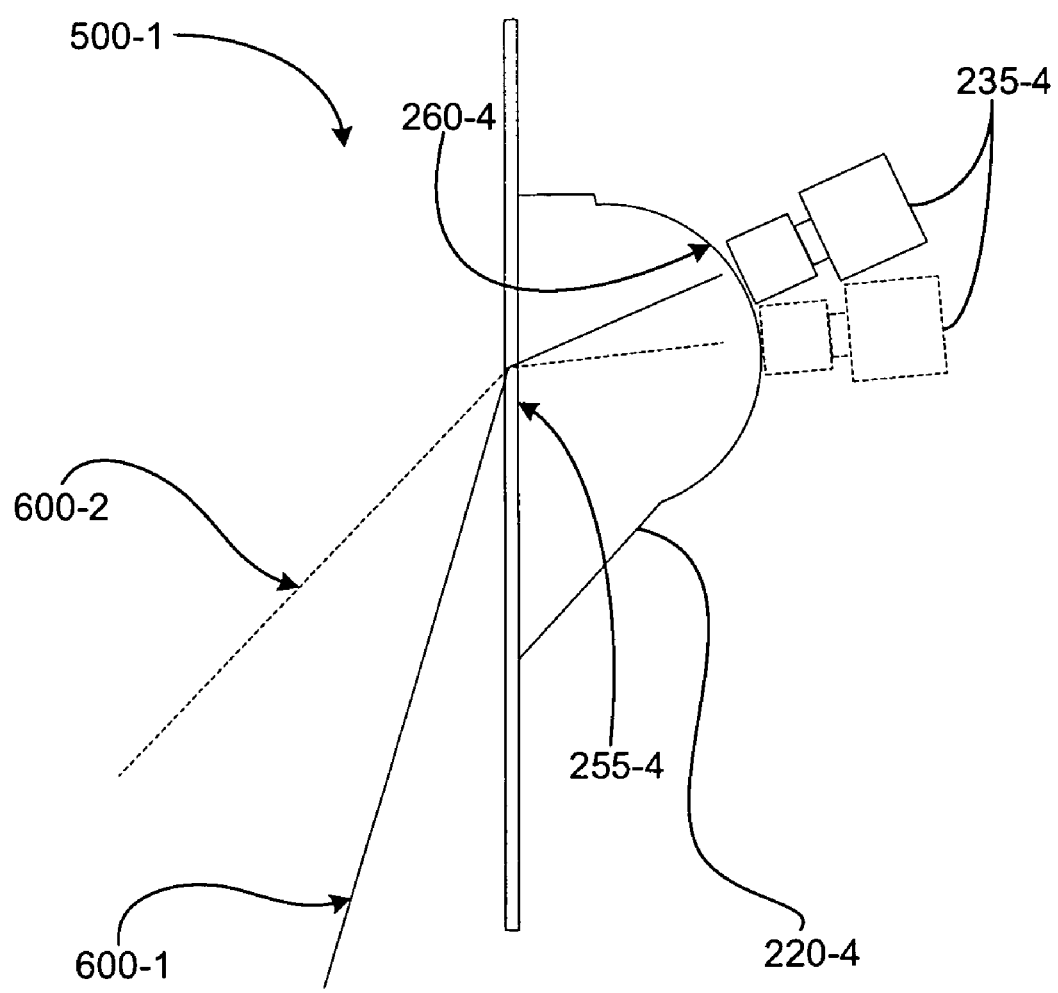
FIG. 7 illustrates a simple schematic view of an exemplary side view imaging system showing multiple imaged areas.

As shown in FIG. 7, a side-view imaging system (500-1) may be provided that allows a user to select the desired side field of view. The system (500-1) includes a refractive block (220-4) having a non-planar light-exit surface (260-4). The shape of the non-planar light-exit surface (260-4) allows light to exit through multiple locations at substantially right angles to the light-exit surface (260-4). The light that exits each location corresponds to a different field of view. At any given time, light corresponding to other fields of view is also being directed through the refractive block (220-4). The image-sensing component (235-4) may be moved to various locations about the refractive block (220-4) to receive images from those fields of view. Two such locations will now be discussed with reference to the solid lines and the dashed lines shown in FIG. 7.

The center of one field of view is represented by the solid line. While the image-sensing component (235-4) is in this location, it receives light that enters the light entrance surface (255-4) of the refractive block (220-4) within the first field of view (600-1). As the light corresponding to the first field of view (600-1) exits the light-exit surface (260-4), the light exits at a right angle to the light-exit surface (260-4). As previously discussed, maximum light transmission occurs from an object when light exits at a right angle to the exit surface.

Similarly, if it is desired to view another field of view, such as center of that field of view represented by the dashed line, the image-sensing component (235-4) may be moved to another location on the light-exit surface (260-4) to thereby change the field of view detected by the image-sensing component (235-4), such as to view the second field of view (600-2). In other words, changing the location on the light-exit surface where the image-sensing component (235-4) receives light changes the field of view the system detects. Accordingly, such a configuration increases the capabilities of such a system to detect and display fields of views on the side of a vehicle while minimizing or eliminating external protrusions.

The exemplary side-view imaging systems discussed with reference to FIGS. 6–7 make use of lenses configured to be directly connected to the light-exit surfaces (260-3, FIG. 5; 260-4, FIG. 7). These systems may be configured to operate with conventional lenses by making use of air gaps, as previously described with reference to the frontal-view imaging systems. Further, the refractive block (220-4) and image-sensing component (235-4) may also be adapted for use with a pedestrian/cross traffic identification system.

Imaging System for Use with Pedestrian/Cross Traffic ID Systems

Figure 8:
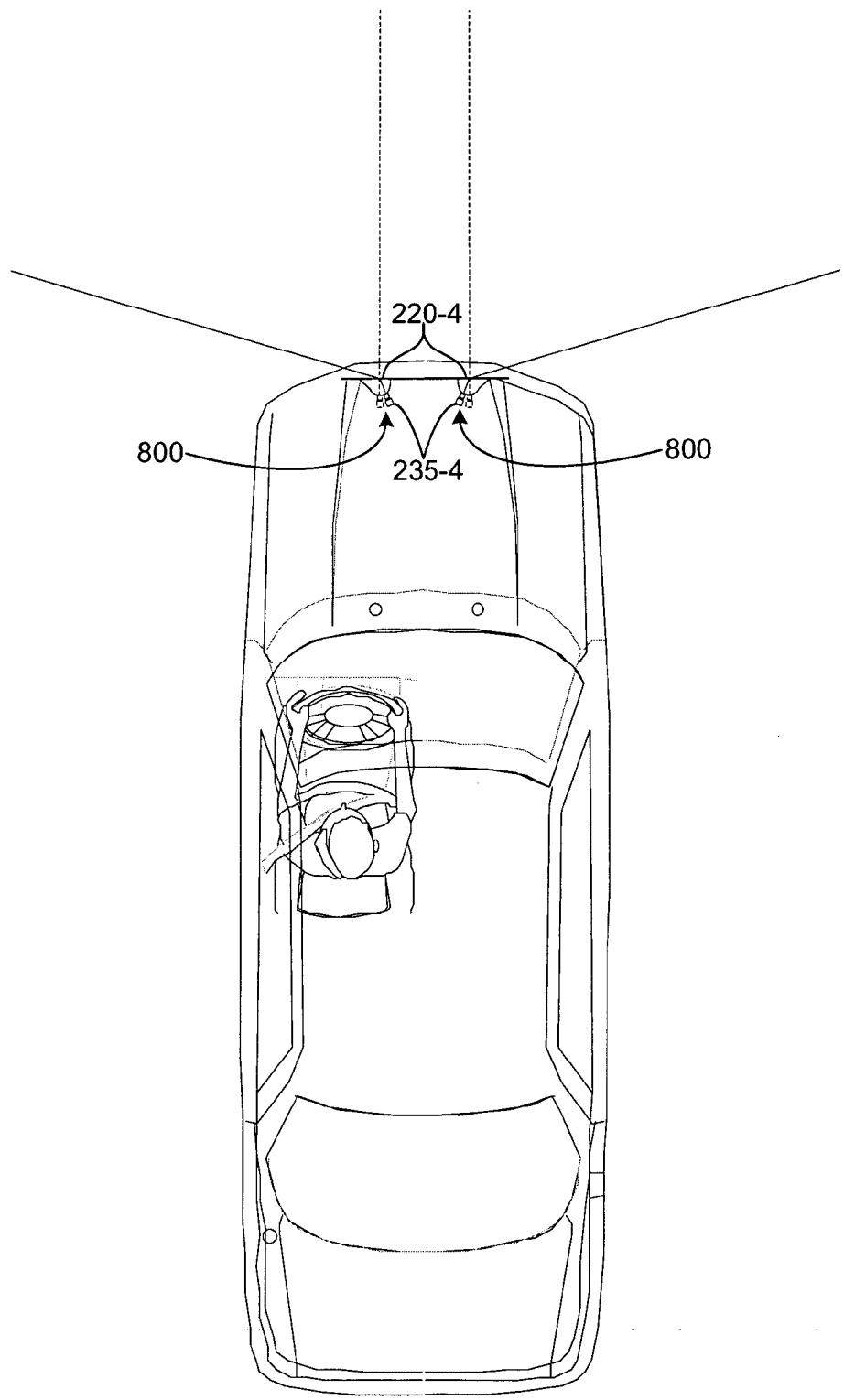
FIG. 8 shows an exemplary imaging system configured for use in a pedestrian/cross traffic identification system.

FIG. 8 is a schematic view of exemplary imaging systems (800) configured to provide images for use by a pedestrian/cross traffic identification system. The imaging system (800) makes use of the refractive block (220-4) that is mounted toward or in the front of a vehicle substantially without external protrusions. The imaging system (800) is configured to provide images used in detecting objects to the side of the vehicle during relatively low speed applications. In such applications, the image-sensing component (235-4) may be placed in a first position, such that the system (800) acquires the images to the side of the vehicle to detect the presence of objects or persons, such as pedestrians approaching the vicinity of the vehicle from the sides of the vehicle, and for cross-traffic identification applications. In addition, it may be desirable to modify the function of the image sensing components when the vehicle is being operated at higher speeds such that the usefulness of a side sensing imaging system is of less importance than a forward sensing imaging system. Thus, for example, in higher speed applications, the image-sensing component (235-4) may be moved to a second position such that the system (800) is able to acquire images ahead of the vehicle to provide information for use in other vehicle system applications, including but not limited to lane departure warning systems, stop-and-go systems, and collision avoidance systems.

In conclusion, the present apparatus and system provides a refractive block for refracting light to an image-sensing component. Such a configuration minimizes the accumulation of contaminants in the optical path within a vehicle, minimizes the intrusion of the imaging system into the passenger compartment, and allows for the elimination of external protrusions in providing side, rear, and blind spot views of the vicinity of a vehicle. Further, such a system may be adapted for use in pedestrian/cross traffic identification systems.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A refractive block, comprising:
a light-entrance surface configured to be mounted in contact with a refractive boundary of a vehicle; and
a light-exit surface wherein said refractive block is configured to refract an optical path of light corresponding to an imaged area and to direct said light to an image-sensing component.

2. The refractive block of claim 1, and wherein said refractive block is formed of a material of having an index of refraction tat is substantially similar to an index of refraction of said refractive boundary.

3. The refractive block of claim 1, and further comprising a plurality of peripheral surfaces being treated to minimize the entrance of light there tbxough.

4. The refractive block of claim 3, and wherein said peripheral surfaces are roughened.

5. The refractive block of claim 3, and wherein said peripheral surfaces are darkened.

6. The refractive block of claim 1, and wherein said light-exit surface comprises a non-planar surface.

7. The refractive block of claim 6, and wherein said light-exit surface is configured to operate as a first optical surface of said image-sensing component.

8. The refractive block of claim 6, and wherein said light-exit surface is configured to selectively direct light to said image sensing corresponding to a plurality of imaged areas.

9. The refractive block of claim 6, and wherein said light-exit surface comprises a planar surface.

10. The refractive block of claim 9, and wherein said refractive block is configured to direct said light through said light-exit surface at substantially a fight-angle.

11. The refractive block of claim 1, and further comprising an antireflective coating on said light-exit surface.

12. An imaging system, comprising:
a refractive block configured to be mounted in contact with an interior surface of a refractive boundary of a vehicle and configured to refract an optical pat of light corresponding to an imaged area; and
an image-sensing component in optical communication with said refractive block.

13. The system of claim 12, and wherein said refractive block comprises a material having an index of refraction substantially similar to an index of refraction of said refractive boundary.

14. The system of claim 13, and further comprising an adhesive between said refractive block and said refractive boundary.

15. The system of claim 14, wherein said adhesive comprises a material having an index of refraction substantially similar to said index of refraction of said refractive boundary.

16. The system of claim 12, and further comprising an air gap between a light-exit surface of said refractive block and a first optical surface of said image-sensing component.

17. The system of claim 12, and wherein a light-exit surface of said refractive block comprises a first optical surface of said image-sensing component.

18. The system of claim 12, and wherein a light-exit surface of said refractive block comprises a planar surface.

19. The system of claim 18, and wherein said light exits said refractive block substantially normal to said light-exit surface.

20. The system of claim 12, wherein refractive block is configured to allow said image-sensing component to receive light from a light-exit surface, said light corresponding to a plurality of imaged areas.

21. The system of claim 20, wherein said refractive block comprises a wedge.

22. The system of claim 12, wherein said refractivd boundary comprises a vehicle windshield.

23. The system of claim 12, wherein said refractive boundary comprises a side-window or a substantially transparent side panel of a vehicle.

24. The system of claim 12, wherein said image-sensing component is part of a pedestrian/cross-traffic detection system.

25. . An imaging system, comprising:
at least one refractive block configured to be mounted in contact with an interior surface of a side window of a vehicle and configured to refract an optical pat of light corresponding to an imaged area, said imaged area corresponding to a sideward and rearward view of said vehicle;
at least one an image-sensing component in optical communication with said refractive block; and
at least one display device configured to display an image corresponding to said image area.

26. The system of claim 25, and farther comprising a plurality of refractive blocks and a plurality of image-sensing components, said refractive blocks and image-sensing components being configured to image an area rearward and sideward of a passenger side of said vehicle and rearward and sideward of a driver side of said vehicle.

27. The system of claim 25, wherein said refractive block comprises a boundary contacting surface and an exit surface, said exit surface being non-planar.

* * * * *